No. 668,614. Patented Feb. 19, 1901.
A. MASION.
APPARATUS FOR USE IN MAKING CHAINS.
(Application filed Oct. 30, 1900.)
(No Model.)
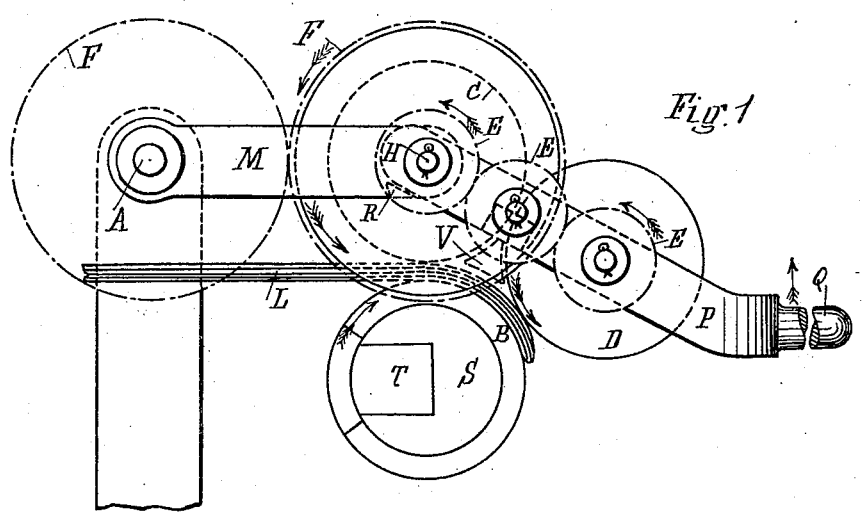
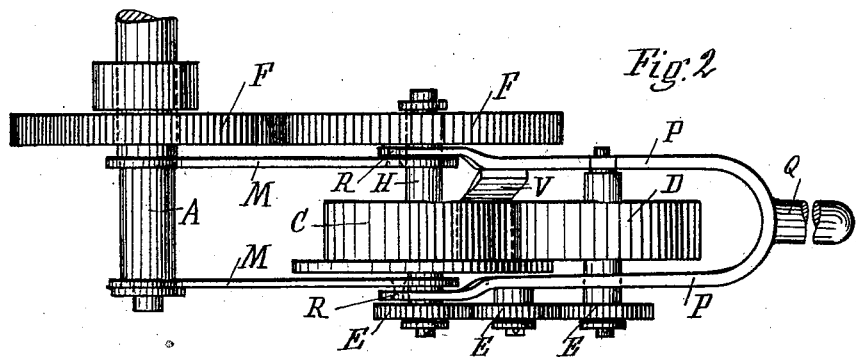
WITNESSES:
R. W. Wright
M. H. Miley
INVENTOR
ALFRED MASION
BY Howson and Howson
HIS ATTORNEYS.
THE NORRIS PETERS CO., PHOTO-LITHO., WASHINGTON, D. C.

UNITED STATES PATENT OFFICE.

ALFRED MASION, OF BRUSSELS, BELGIUM, ASSIGNOR TO SOCIÉTÉ GENERALE DU LAMINAGE ANNULAIRE POUR LA FABRICATION DE CHAINES SANS SOUDURE, OF SAME PLACE.

APPARATUS FOR USE IN MAKING CHAINS.

SPECIFICATION forming part of Letters Patent No. 668,614, dated February 19, 1901.

Application filed October 30, 1900. Serial No. 34,973. (No model.)

*To all whom it may concern:*

Be it known that I, ALFRED MASION, a subject of the King of Belgium, residing in Brussels, Belgium, have invented Improvements in Apparatus for Use in Making Chains, of which the following is a specification.

In the specifications of previous and foreign patents apparatus is described having for its object the manufacture of chains with the links thereof formed by the superposed winding of a metal band, strip, or wire (hereinafter referred to as a "strip") raised to a welding heat through a chain-link previously formed. This apparatus comprised hooking or otherwise fastening the strip to be wound on the winding ring or roll, and whatever was the system of gripping employed it necessitated stopping the winding apparatus, thereby causing loss of time and a consequent partial cooling of the end of the strip, which injuriously affected its welding properties, so that the chain was liable to have links imperfectly welded and require reheating and reworking.

The present invention has for its object to overcome these objections, and this is effected by means of apparatus for winding wire or metal strips under pressure, which I will describe with reference to the accompanying drawings, in which—

Figure 1 is a side elevation, and Fig. 2 is a plan.

This apparatus insures the engagement of the metal strip L without the need of hooking or otherwise engaging the same on the winding ring or roll B, and comprises two compressing cylinders or rolls C D, placed adjacent to each other and geared together by the spur-wheels E E E, so as to be driven in the same direction, the driving being effected from the driving-shaft A by spur-wheels F F on the said shaft A and the axis H of the cylinder or roll C, respectively. The axis of the cylinder or roll C is carried by levers M, capable of turning on the driving-shaft A, and the axis of the cylinder or roll D is carried by a forked lever capable of turning on the axis H, so as to allow the cylinder or roll D to be displaced in relation to the cylinder or roll C, which displacement is necessary because the centers of the cylinders or rolls C and D do not occupy the same relative position with reference to the fixed point constituted by the driving-shaft A, when the said cylinders or rolls are raised by the superposition of the windings of the strip on the winding ring or roll. By the arrangement described the two compressing cylinders or rolls are always kept in perfect contact with the strip being wound on the winding ring or roll.

At the beginning of each operation cylinders or rolls C and D must both be raised to allow of the insertion of the strip to be wound, and it is convenient to be able to raise both cylinders or rolls C and D simultaneously, and this can be done by raising a handle Q at the end of the forked lever P, carrying the cylinder or roll D, the rotation of the said lever P around the axis H being limited in one direction by stops R, carried by the levers M, so that when the said handle Q is raised the bifurcations of the lever P strike against the said stops R and prevent further independent motion of the lever P, and if the upward movement be still continued the levers M and cylinder-roll C are raised with the lever P and with it the roll C. This takes place without the rolls C and D coming out of gear with the driving-shaft A.

Instead of the levers P and M slides may be used, enabling the rolls C and D to be displaced at right angles to their center lines. S is the cylinder-support for the winding ring or roll, with a recessed part T for the reception of the previously-formed link, both elements described in the aforesaid specifications of former Letters Patent.

The apparatus operates as follows: The winding ring or roll B is rotated in the direction indicated by the arrow thereon. The levers M, cylinder or roll C, lever P, and cylinder or roll D are raised by lifting the handle Q, leaving a free space between the cylinder or roll C and the winding ring or roll B sufficient for the introduction of the metal strip. The apparatus is placed in front of a furnace-door and the end of a metal strip presented to the upper side of the winding roll or ring B, and the cylinders or rolls C and D are then lowered. On the end of the metal strip being taken between the winding ring or roll B and the cylinder or roll C it is drawn forward as in a rolling-mill. The speed of the cylinder or roll C is made to exceed that of the winding ring or roll B, so that the metal strip L has a tendency to turn downwardly rather than to pass straight along. The straightening of the strip is further prevented by a guiding-piece V, provided on the lever P between the two cylinders or rolls C and D. In this manner the strip is compelled to pass under the cylinder or roll D, the action of the winding-ring and cylinders or rolls C D continuing to traverse the strip while insuring its taking a curve having a radius equal to the exterior radius of the winding ring or roll B. When one revolution of the winding ring or roll has been effected, the second winding will be welded to the first, the rolling action producing perfect homogeneity in the link by any desired pressure from the cylinders or rolls.

I claim as my invention—

1. For use in the manufacture of chains by winding or rolling a metal strip at welding heat on a winding ring or roll, the combination of a driving-shaft, a frame, a winding ring or roll and two compressing cylinders or rolls closely adjacent to each other and geared together and with the driving-shaft with means whereby the said cylinders or rolls can be caused to approach to, or recede from, the winding ring or roll and bend the strip on the winding ring or roll without fastening the strip to the winding ring or roll, substantially as described.

2. For use in the manufacture of chains by winding or rolling a metal strip at welding heat on a winding ring or roller, the combination of a driving-shaft, a frame, a winding ring or roll, a pair of levers hinged to each other, and each carrying a compressing cylinder or roll geared together and with the driving-shaft, and a guiding-piece between the two compressing-rolls, all substantially as and for the purpose set forth.

In testimony whereof I have signed my name to this specification in the presence of two subscribing witnesses.

ALFRED MASION.

Witnesses:
GUST. PIERRY,
EMILE NUYTS.